US012699050B2

(12) United States Patent
Jünemann

(10) Patent No.: US 12,699,050 B2
(45) Date of Patent: Aug. 4, 2026

(54) GAS DETECTION APPARATUS HAVING TWO MEASUREMENT CHAMBERS AND TWO DETECTORS

(71) Applicant: bentekk GmbH, Lübeck (DE)

(72) Inventor: Arne Jünemann, Hamburg (DE)

(73) Assignee: bentekk GmbH, Lübeck (DE)

( * ) Notice: Subject to any disclaimer, the term of this patent is extended or adjusted under 35 U.S.C. 154(b) by 848 days.

(21) Appl. No.: 17/586,398

(22) Filed: Jan. 27, 2022

(65) Prior Publication Data

US 2022/0236182 A1 Jul. 28, 2022

(30) Foreign Application Priority Data

Jan. 27, 2021 (DE) ...................... 10 2021 101 795.5

(51) Int. Cl.
| | |
|---|---|
| *G01N 21/17* | (2006.01) |
| *G01N 21/59* | (2006.01) |
| *G01N 27/64* | (2006.01) |

(52) U.S. Cl.
CPC ......... *G01N 21/59* (2013.01); *G01N 21/1702* (2013.01); *G01N 27/64* (2013.01)

(58) Field of Classification Search
CPC .... G01N 21/59; G01N 21/1702; G01N 27/64; G01N 21/05; G01N 2021/1704;
(Continued)

(56) References Cited

U.S. PATENT DOCUMENTS 3,770,974 A * 11/1973 Fertig .................... G01N 21/37
250/341.5
4,376,892 A 3/1983 Charpak et al.
(Continued)

FOREIGN PATENT DOCUMENTS

| CN | 110596232 A | 12/2019 |
|---|---|---|
| DE | 19957364 A1 | 8/2000 |

(Continued)

OTHER PUBLICATIONS

Office Action dated Jun. 1, 2023, directed to DE Application No. 102022101882.2; 15 pages.

*Primary Examiner* — Isiaka O Akanbi
(74) *Attorney, Agent, or Firm* — McGlew and Tuttle, P.C.

(57) ABSTRACT

Gas detection apparatus for the detection of a target gas in a gas mixture, having a radiation source, a first measurement chamber and a second measurement chamber, as well as a first and second measurement detector. A first gas mixture flows through the first measurement chamber, and a second gas mixture flows through the second measurement chamber. Electromagnetic radiation emitted by the radiation source passes initially through the first measurement chamber and subsequently through the second measurement chamber. The first measurement detector registers a physical effect in the first measurement chamber, this physical effect correlating with the intensity of the radiation passing through the first measurement chamber, and generates a first signal correlating with the physical effect. The second measurement detector is correspondingly configured for the second measurement chamber. A second measurement point is thus provided without requiring a second radiation source.

20 Claims, 4 Drawing Sheets

(58) Field of Classification Search
    CPC ... G01N 2021/8557; G01N 2021/8578; G01N
                    21/85; G01N 2021/0314; G01N
                    2201/066; G01N 21/031
    USPC ..... 356/432, 436, 437, 323, 456; 250/341.7,
                                        250/345, 343
    See application file for complete search history.

(56)                        References Cited

U.S. PATENT DOCUMENTS

| | | | | | |
|---|---|---|---|---|---|
| 4,692,622 | A | * | 9/1987 | Taniguchi .............. | G01N 21/37 |
| | | | | | 250/343 |
| 5,055,688 | A | | 10/1991 | Fabinski | |
| 5,292,666 | A | * | 3/1994 | Fabinski ............ | G01N 33/1846 |
| | | | | | 436/116 |
| 5,900,635 | A | * | 5/1999 | Weckstrom ........ | G01N 21/3504 |
| | | | | | 250/343 |
| 6,147,351 | A | * | 11/2000 | Huiku ................ | G01N 21/0303 |
| | | | | | 250/343 |
| 6,166,383 | A | * | 12/2000 | Kimmig ................ | G01N 21/37 |
| | | | | | 250/343 |
| 10,768,101 | B2 | * | 9/2020 | Schossig ............ | G01N 21/3504 |
| 2010/0066355 | A1 | * | 3/2010 | Krause .................. | G01D 18/00 |
| | | | | | 324/228 |
| 2011/0032514 | A1 | * | 2/2011 | Bitter .................... | G01N 21/37 |
| | | | | | 356/51 |

FOREIGN PATENT DOCUMENTS

| | | | |
|---|---|---|---|
| EP | 0427037 | A2 | 5/1991 |
| EP | 1243921 | A2 | 9/2002 |
| EP | 1262770 | A2 | 12/2002 |

* cited by examiner

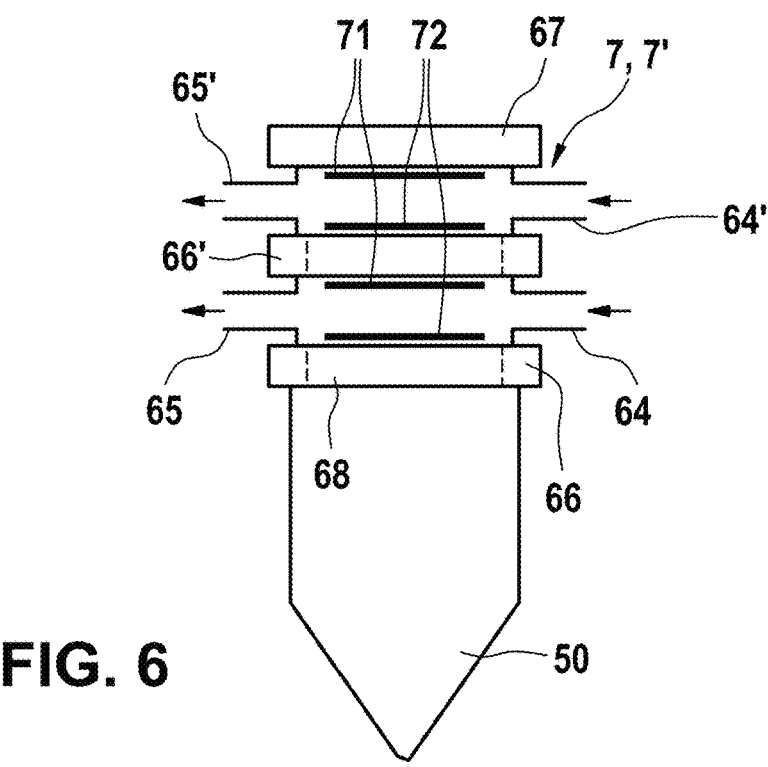
FIG. 6
FIG. 7A
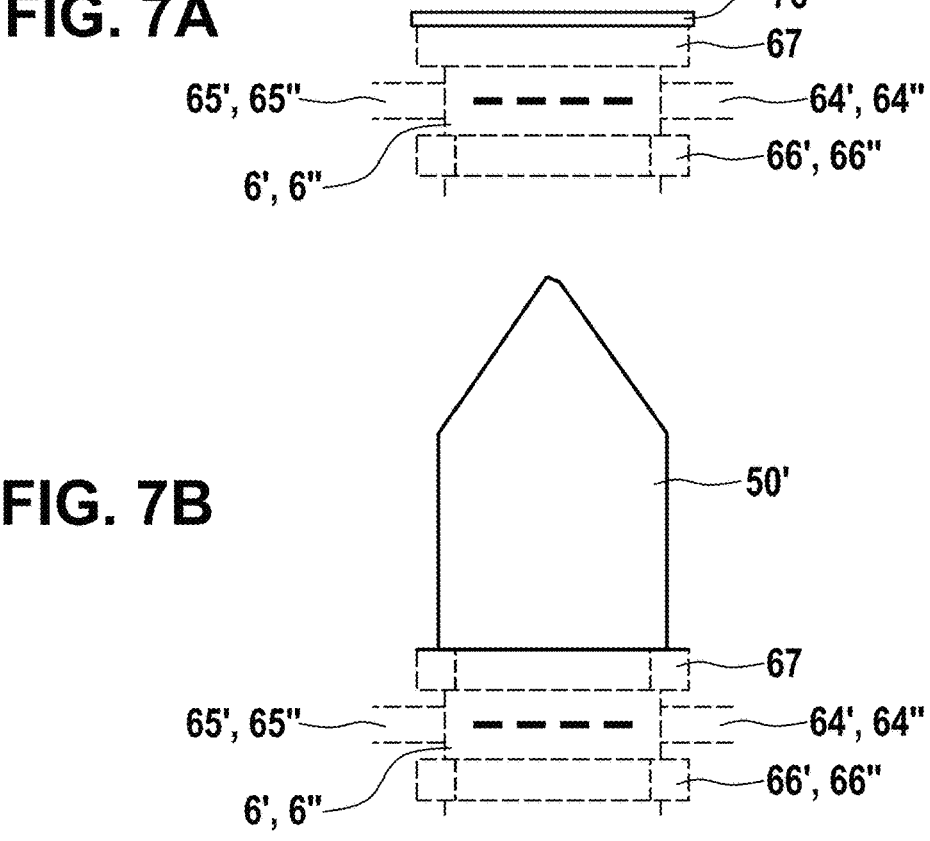
FIG. 7B

GAS DETECTION APPARATUS HAVING TWO MEASUREMENT CHAMBERS AND TWO DETECTORS

CROSS-REFERENCE TO RELATED APPLICATIONS

This application claims the priority of German Application No. 10 2021 101 795.5, filed Jan. 27, 2021, the entire contents of which are incorporated herein by reference.

FIELD OF THE DISCLOSURE

The invention relates to a gas detection apparatus for the detection of a target gas in a gas mixture.

BACKGROUND OF THE DISCLOSURE

In a gas detection apparatus, a measurement chamber and a measurement detector, in particular configured as a photoionization detector, are provided for the detection of a gas in gas mixtures. Such gas detection apparatuses are used both in static and, in particular, also in portable apparatuses. The gas mixture is introduced into the measurement chamber by means of a pump or another propulsive feed unit, and this gas mixture is exposed to electromagnetic radiation which is shone into the measurement chamber by a corresponding radiation source (this is generally a lamp, in particular a UV lamp). One advantage of photoionization detectors as measurement detectors is that they are compact and robust, so that they are suitable for use in portable gas detection apparatuses. Such a gas detection apparatus is sold, for example, by Drager (Lubeck, Germany) under the name X-PID.

CN 110596232 A and EP 1 262 770 A2 respectively present a gas detection apparatus having a radiation source which is configured to emit electromagnetic radiation, a measurement chamber, as well as a measurement detector, wherein the gas mixture or at least a part of the gas mixture flows through the measurement chamber and openings, through which the gas flowing through the gas measurement path flows into and out from the measurement chamber, are respectively arranged transversely with respect to the direction of the emitted radiation on mutually opposite wall sections of the wall. EP 1 243 921 A2 discloses a gas detection apparatus which, by means of a common radiation source, shines through a plurality of successively arranged electrodes which are arranged in a common measurement chamber of a photoionization detector.

SUMMARY OF THE DISCLOSURE

An object of the invention is to improve a gas detection apparatus in such a way as to detect the or at least one target gas with a greater reliability.

This object is achieved by a gas detection apparatus for the detection of at least one target gas in at least one gas mixture, wherein the gas detection apparatus comprises a radiation source which is configured to emit electromagnetic radiation, a first measurement chamber and a second measurement chamber, as well as a first measurement detector and a second measurement detector, wherein the second measurement chamber is spatially separated from the first measurement chamber, wherein the gas detection apparatus is configured in such a way that a first gas mixture flows through the first measurement chamber and a second gas mixture flows through the second measurement chamber, wherein the gas detection apparatus is configured in such a way that electromagnetic radiation emitted by the radiation source passes initially through the first measurement chamber and subsequently through the second measurement chamber, wherein the first measurement detector is configured to measure a gauge of a physical effect in the first measurement chamber, this physical effect being caused by electromagnetic radiation which passes through the first measurement chamber and correlating with the presence of target gas in the first measurement chamber, and to generate a first signal correlating with the physical effect in the first measurement chamber, and wherein the second measurement detector is configured to measure a gauge of a physical effect in the second measurement chamber, this physical effect being caused by electromagnetic radiation which passes through the second measurement chamber and correlating with the presence of target gas in the second measurement chamber, and to generate a second signal correlating with the physical effect in the second measurement chamber.

Some of the terms used will first be explained:

The electromagnetic radiation may be light, in particular UV light or visible light, or alternatively radiofrequency radiation or X-radiation, in particular soft X-radiation (photon energy at most 5 keV).

A "measurement chamber separator" is intended to mean a structure, in particular on or in a wall of the measurement chamber, which is impermeable for fluids, in particular gases, and for radiation. The same applies here for the term "measurement chamber window", with the proviso that it is however permeable for the electromagnetic radiation.

The first gas mixture which flows through the first measurement chamber may be different to the second gas mixture which flows through the second measurement chamber. Independent measurements may therefore be carried out. The difference between the gas mixtures is not however obligatory, and gas mixtures which are at least partially the same in respect of their constituents, identical gas mixtures or the same gas mixture may be involved. This offers advantages for comparative measurements or reference measurements.

The "caused physical effect" is, for example, an attenuation of electromagnetic radiation, an ionization of modules, an acoustic effect or a physically measurable chemical effect.

Each measurement detector interacts respectively with a measurement chamber in the manner described below. It measures a physical effect in the associated measurement chamber, this physical effect being caused by electromagnetic radiation which passes through this measurement chamber and correlating with the presence of target gas in the measurement chamber, and generates therefrom a signal correlating with the measured physical effect.

Aspects of the invention are based on the idea of increasing the reliability of the measurement by providing a second measurement chamber, with its own second measurement detector associated with it, in addition to the first measurement chamber, and by shining electromagnetic radiation from the same radiation source through the two measurement chambers in the sense that the electromagnetic radiation emitted by the radiation source passes initially through the first measurement chamber and subsequently through the second measurement chamber. By the gas detection apparatus having a second measurement chamber, an additional measurement point spatially separated from the first measurement chamber is provided, through which a different gas mixture or an identical gas mixture or the same gas mixture as the first measurement chamber may flow, so that two mutually independent measurements are carried out at two measurement points in separate measurement chambers. According to aspects of the invention, the measurement chambers are passed through by electromagnetic radiation which is emitted by the same radiation source. This saves on a second, additional radiation source for the second measurement chamber. Furthermore, in many cases it ensures that because of the jointly used radiation source, the radiation passing through the respective measurement chamber is the same or, at least in the absence of target gas, by design the radiation through the second measurement chamber is (coupled) in a fixed ratio to the radiation through the first measurement chamber. Signals generated for measurement values by the respective measurement detectors may therefore be compared with one another since the radiation parameters (intensity, wavelength, etc.) in both measurement chambers are determined by the same radiation source and are therefore mutually coupled. Thus, variations of the radiation, for example due to ageing of the radiation source and/or the influence of environmental conditions, act synchronously on both measurement chambers so that such variations are to a certain extent cancelled out, particularly in the case of comparative measurements, and can therefore vitiate the measurement result to a smaller extent. This represents a considerable practical advantage, in particular for relative or differential measurements or for compensating for ageing-induced variations of the emitted radiation. Furthermore, in particular when delivering the same gas mixture into both measurement chambers, greater reliability of the measurement result may be achieved since in many cases measurement errors of the two measurement detectors may be in opposition to another and attenuate one another, and desirable redundancy may be provided if one of the measurement detectors or one of the measurement chambers fails.

Expediently, the gas detection apparatus is furthermore configured in such a way that a radiation direction in which electromagnetic radiation passes through the first measurement chamber is perpendicular or oblique with respect to a flow direction in which the first gas mixture flows through the first measurement chamber, and/or a radiation direction in which electromagnetic radiation passes through the second measurement chamber is perpendicular or oblique with respect to a flow direction in which the second gas mixture flows through the second measurement chamber. With this arrangement, the direction of the radiation is substantially transverse with respect to the flow directions of both gas mixtures. A transverse flow principle is therefore obtained for at least one measurement chamber, preferably for both measurement chambers, which provides favourable flow conditions. In particular, the formation of a laminar flow of the gas mixture, which is advantageous for a precise measurement, is favoured by the transverse flow principle. This allows a secure and reliable measurement even with a relatively low flow rate of the respective gas mixture. Furthermore, shining through perpendicularly or obliquely with respect to the flow direction has the advantage that the points at which the radiation enters the measurement chamber and emerges again are respectively arranged at a different place, in particular on other sides, of the measurement chamber than the connections for the delivery or discharge of the gas mixture. The risk of mutual interference, which could lead to inaccuracies and an inferior measurement quality, is therefore reduced.

Advantageously, the gas detection apparatus comprises a measurement chamber separator which separates the first measurement chamber in a gastight fashion from the second measurement chamber and forms both a part of a wall of the first measurement chamber and a part of a wall of the second measurement chamber, a measurement chamber window which is permeable for electromagnetic radiation being formed in the measurement chamber separator, and the gas detection apparatus being configured in such a way that electromagnetic radiation emitted by the radiation source passes through the first measurement chamber, then the or at least one measurement chamber window and then the second measurement chamber. With the measurement chamber separator, a particularly compact and small gas detection apparatus may therefore be provided, in particular because the two measurement chambers form a single component. The radiation emitted by the radiation source may therefore travel on a relatively short path from one measurement chamber into the other measurement chamber. This allows a particularly compact embodiment. Furthermore, in relation to the radiation this ensures particularly close coupling of the two measurement chambers in respect of the radiation, so that the radiation entering the second measurement chamber is coupled in the second measurement chamber to the radiation leaving the first measurement chamber.

Furthermore, advantageously, the measurement chamber window may be provided with an optical filter and the optical filter may be adapted to attenuate electromagnetic radiation in at least one wavelength range. This may be done by the optical filter being arranged as a separate element on the measurement chamber window or by the optical filter being integrated into the measurement chamber window (in the case of optical radiation, for example by coloration of the measurement chamber window). In this way, the second measurement chamber receives the radiation with a reduced spectrum. It is particularly preferred for the gas detection apparatus to comprise a first optical filter and a second optical filter, the first optical filter being located between the radiation source and the first measurement chamber and the second optical filter being located between the first optical filter and the second measurement chamber, so that the electromagnetic radiation passes initially through the first optical filter and then through the second optical filter, and the second optical filter preferably having a narrower transmission band than the first optical filter. In this way, broadband measurements (with a full or broader spectrum) may be carried out in the first measurement chamber and selective measurements (with a reduced, i.e. narrower spectrum) may be carried out in the second measurement chamber, the selective measurement in the second measurement chamber being coupled to the measurement in the first measurement chamber (broadband measurement), for example in relation to the intensity of the radiation, by the jointly used radiation source. For example, the radiation source emits a radiation with such a large spectrum that the spectrum of the radiation contains at least two different spectral lines (for example spectral lines at 10.0 eV and 10.6 eV in the case of a krypton radiation source). In the first measurement chamber, lying closer to the radiation source, detection is expediently carried out with a full spectrum and the maximum ionization energy of 10.6 eV, the optical filter at the boundary with the second measurement chamber having a narrower transmission band than the first optical filter so that the 10.6 eV spectral line is removed by filtering (for example with calcium fluoride $CaF_2$ as the material) and the second measurement chamber is then irradiated with the 10.0 eV spectral line. Different study objectives may therefore advantageously be combined, in particular by using the higher-energy 10.6 eV spectral line with a view to a better detection limit and with the 10.0 eV spectral line in order to use the better selectivity provided there.

It should be noted that the measurement chamber separator and the optical filter may be constructed in one piece or several pieces, i.e. the gastight separating function and the filter function are combined in one element, or separate elements are provided for the gastight separating function and spectrum-dependent different transmission properties (optical filters).

Expediently, the first measurement chamber and the second measurement chamber respectively have their own openings for the inward flow and openings for the outward flow for the respective gas mixture, so that the respective gas mixture can flow through them independently of one another. For instance, different gas mixtures may flow through the two measurement chambers, a first gas mixture through the first measurement chamber and a different, second gas mixture through the second measurement chamber. This may, for example, be used in order to provide a reference gas which is known in its composition as the target gas for the first measurement chamber and a sample gas, to be studied in respect of its composition, as the target gas for the second measurement chamber.

It is, however, possible for a fluid connection to connect the first measurement chamber to the second measurement chamber, so that the same gas mixture flows through both measurement chambers. The gas mixture in this case flows initially through one measurement chamber, then through the fluid connection and then through the other measurement chamber. A sequential interconnection (series interconnection) of the measurement chambers is formed in this way. It is also possible that a part of the gas mixture flows through both measurement chambers and another part of the gas mixture is branched off in the fluid connection, for example for study outside the measurement chambers.

It is furthermore possible for the two measurement chambers to be arranged in parallel with one another and for the two gas mixtures to correspond. The gas mixture is split upstream of the two measurement chambers so that a first part of the gas mixture flows through the first measurement chamber and a second part of the gas mixture flows through the second measurement chamber. The same gas mixture then flows through both measurement chambers. This allows a greater throughput and a faster response behaviour in the event of variations of the gas mixture, for example a varying concentration, compared with a gas detection apparatus having only one measurement chamber.

It is also possible for two different gas mixtures to flow through the two measurement chambers arranged in parallel. One gas mixture flows only through the first measurement chamber and the other gas mixture flows only through the other measurement chamber.

Preferably, the gas detection apparatus comprises a reflector for electromagnetic radiation, the radiation source and the reflector being arranged in such a way that the electromagnetic radiation emitted by the radiation source passes through the two measurement chambers for a first time, is reflected by the reflector and passes through the two measurement chambers for a second time. By means of the reflector, the radiation is thus reflected back through the measurement chambers again and the optical path achieved, and therefore the physical effect caused, are increased. The usable radiation in the measurement chambers may therefore be increased with little outlay. This also permits a further increase in the measurement sensitivity with little outlay.

In one advantageous embodiment, the gas detection apparatus is configured in such a way that an identical gas mixture or even the same gas mixture is delivered to both measurement chambers. In this case, the first measurement detector is configured to detect at least one predetermined target gas in the gas mixture delivered to the first measurement chamber and to generate a signal correlating with the presence or absence of the target gas in the gas mixture as a first signal, and the second measurement detector is configured to analyse the gas mixture in the second measurement chamber and to generate a signal correlating with a composition of the gas mixture as a second signal. A test for the presence of a particular gas (the target gas) may therefore be carried out by means of the first measurement chamber. The gas mixture may then be analysed in respect of constituents by means of the second measurement chamber. In this sense, the first measurement chamber may function as a probe for the target gas and the second measurement chamber as an analysis device. The same radiation source is used for both measurement chambers. This allows a particularly compact and economical structure. This saves on outlay and allows an increase in the measurement quality by virtue of two measurement chambers and a common radiation source.

In one refinement of this embodiment, a separating column is arranged before the second measurement chamber. A separating column typically comprises a tube or capillary having a defined internal diameter, through which a gas mixture having substances to be analysed is fed; such a separating column represents the key part of a gas chromatograph, and the structure and functional principle of a separating column are known to the person skilled in the art. Often, a plurality of separating columns and/or a multiplicity of capillaries are provided for the separating column, in particular for multiparameter measurements. It is thus possible for different separating columns or different capillaries of a separating column to be able to be attached to the measuring chambers of the gas detection apparatus according to the invention. With such a different configuration, it is possible for a separate measurement chamber respectively to be provided for each separating column and/or each capillary.

Expediently, to this end the gas detection apparatus furthermore comprises a calibration device which is configured to calibrate the sensitivity of the separating column by using the second measurement detector. Thus, the upstream separating column may be calibrated with relatively little outlay by using the second measurement chamber. Rapid and substantially autonomous calibration may therefore be achieved, which represents a valuable advantage in particular for portable gas detection apparatuses in field use since a central test station is not needed. It is not necessary to bring the portable gas detection apparatus to these central test stations for the purpose of calibration. The calibration device may furthermore be adapted to carry out the calibration by using the coupling of the two measurement chambers with their measurement detectors. For instance, the calibration device may also be adapted to perform a sensitivity calibration of the second measurement chamber and its second measurement detector by means of the first measurement chamber with its measurement detector. Thus, fluctuations or variations of the radiation characteristic of the radiation source (for example due to ageing) may also be identified and computationally compensated for to a certain extent.

Preferably, in addition to the two measurement chambers, the gas detection apparatus comprises at least one further measurement chamber and respectively a further measurement detector for the or at least one further measurement chamber, the first measurement chamber, the second measurement chamber and the or each further measurement chamber being arranged in a stack, the gas detection apparatus being configured in such a way that electromagnetic radiation emitted by the radiation source passes through each measurement chamber at least once, and the or each further measurement detector being configured to measure a gauge of a physical effect in the associated further measurement chamber, this physical effect being caused by electromagnetic radiation which passes through the associated further measurement chamber and correlating with the presence of target gas, and to generate a further signal correlating with the physical effect in the associated further measurement chamber. In this case, the respective flow direction through the measurement chambers is preferably perpendicular or oblique with respect to the stack direction. In this way, further measurement chambers may correspondingly be combined in order to form additional independent measurement points with the joint use of the radiation source. By the further measurement chambers so to speak being capable of being "stacked" on the first and second measurement chambers, this stack design leads to a relatively compact arrangement which not only allows efficient joint use of the radiation source but is furthermore also compact and therefore particularly suitable for a portable gas detection apparatus. Furthermore, this allows a clearly arranged and space-saving attachment of fluid connections to the measurement chambers.

In one configuration, the first measurement detector is or comprises a first ionization detector and the second measurement detector is or comprises a second ionization detector, the first ionization detector being configured to measure a gauge of the ionization of a target gas in the first measurement chamber and to generate a first signal correlating with the ionization in the first measurement chamber as a first signal, and the second ionization detector being configured to measure a gauge of the ionization of a target gas in the second measurement chamber and to generate a second signal correlating with the ionization in the second measurement chamber as a second signal. Preferably, the first and the second measurement detector are respectively produced as a photoionization detector. Photoionization detectors respond robustly and rapidly and thus make a gas detection apparatus, which may be portable, possible in a compact space.

Advantageously, the first and/or the second measurement detector respectively comprises a pair of electrodes, the two electrodes of the electrode pair being arranged in the associated measurement chamber in such a way that the gas mixture flows between the two electrodes when it flows through the measurement chamber. The gas mixture therefore lies in the effective region between the two electrodes, and an increase in the measurement signal and therefore a rise in the sensitivity may therefore be achieved.

It is, however, also possible for the first measurement detector to be or comprise a first absorption detector and for the second measurement detector to be or comprise a second absorption detector, the first absorption detector being configured to measure an absorption of electromagnetic radiation in the first measurement chamber as a gauge of the physical effect and to generate a first signal correlating with the absorption in the first measurement chamber as a first signal, and the second measurement detector being configured to measure an absorption of electromagnetic radiation in the second measurement chamber as a gauge of the physical effect and to generate a second signal correlating with the absorption in the second measurement chamber as a second signal. Preferably, this configuration is combined with at least one optical filter. This is because many target gases absorb a significant proportion of electromagnetic radiation only in particular wavelength ranges.

Furthermore, the first measurement detector may be or comprise a first photoacoustic detector and the second measurement detector may be or comprise a second photoacoustic detector. In the case of a photoacoustic detector, the gas mixture is introduced into a measurement chamber and excited by pulsed electromagnetic radiation. The wavelength of the electromagnetic radiation used is in this case selected in such a way that at least one excitation specific to the target gas to be detected can be generated because the target gas absorbs electromagnetic radiation. The molecules of the target gas are excited by the energy thereby received and subsequently relax by forming a pressure wave. Acoustic waves are formed. The intensity of the acoustic waves, which may be received by a sound transducer (microphone) or another suitable sensor, correlates with the strength of the absorption and is therefore a gauge of the concentration of the target gas. As a gauge of the physical effect, the first measurement detector is adapted to measure a photoacoustic effect in the first measurement chamber, and the second measurement detector makes it possible to measure a photoacoustic effect in the second measurement chamber.

The invention may therefore be applied for different sensor concepts.

Expediently, the measurement chambers respectively comprise a wall, an inlet opening and an outlet opening, the respective gas mixture flowing into the measurement chamber through the inlet opening and out again from the measurement chamber from the outlet opening, and the inlet opening and the outlet opening of a measurement chamber being arranged on two mutually opposite wall sections of the measurement chamber, and preferably being arranged in alignment with one another along an axis. Particularly rapid and reliable formation of the laminar flow may therefore be achieved, which ensures a rapid response behaviour and an improved measurement sensitivity of the gas detection apparatus. Furthermore, by virtue of the laminar flow, no mixing of different gases entering at successive times takes place, and the flow rate of the gas mixture is therefore used better.

It is expedient for at least one measurement chamber to comprise a wall which has an oval shape in a cross-sectional area, two electrodes of the measurement detector being arranged on the two less curved regions of the wall. By arrangement on the less curved sides, a relatively homogeneous layout of the field between the electrodes may be achieved, which ensures more favourable measurement properties (for example linearity). Furthermore, the longer sides of the oval are therefore used for the arrangement of the electrodes, which permits relatively large-area electrodes and therefore an increase in the measurement sensitivity. This configuration may be used particularly in combination with an ionization detector.

Preferably, the gas detection apparatus comprises a fluid feed device, in particular a pump, the fluid feed device causing the or each gas mixture to flow through the gas detection apparatus. In one configuration, the fluid feed device causes the gas mixture to be split and therefore at least a part of the gas mixture to flow through the first measurement chamber and at least another part of the gas mixture to flow through the second measurement chamber. It is also possible for the fluid feed device to convey two different gas mixtures. As an alternative, two different fluid feed devices may be used for two different gas mixtures. With the fluid feed device, secure and reproducible delivery of the gas mixture into the two measurement chambers may be ensured. Furthermore, the gas mixture, or the respective gas mixture, reaches the measurement chambers more rapidly than if the gas mixture diffused into the measurement chambers.

Advantageously, the gas detection apparatus comprises a further radiation source, the first measurement chamber as well as the second measurement chamber being located between the radiation source and the further radiation source. Electromagnetic radiation is thus applied to the two measurement chambers from two opposite sides. The radiation acting overall on the two measurement chambers may therefore be increased and a larger measurement signal may therefore be generated, so that the measurement sensitivity of the gas detection apparatus is advantageously increased. It is particularly expedient for the two electromagnetic radiations which the two radiation sources emit to differ in at least one wavelength range. Broadening of the measurement range may therefore be achieved.

The gas detection apparatus is expediently configured as a portable instrument. In this case, the advantages of the compact layout become particularly effective. It is particularly preferred for the gas detection apparatus to be configured as an instrument which a user can hold in one hand. The user may carry the gas detection apparatus with them and be warned when there is a target gas in their vicinity.

Advantageously, the gas detection apparatus comprises its own voltage supply unit. The latter is preferably formed as a set of rechargeable batteries. This further favours portable use of the gas detection apparatus.

BRIEF DESCRIPTION OF THE FIGURES

The invention will be explained in more detail below with reference to the appended drawings with the aid of exemplary embodiments.

FIG. 6 shows an alternative embodiment of the first embodiment with a different arrangement of the sensor electrode; and FIGS. 7A and 7B show detail views of the end of the gas detection apparatus facing away from the radiation with a fitted reflector or a second radiation source.

DETAILED DESCRIPTION OF THE DISCLOSURE

Figure 1:
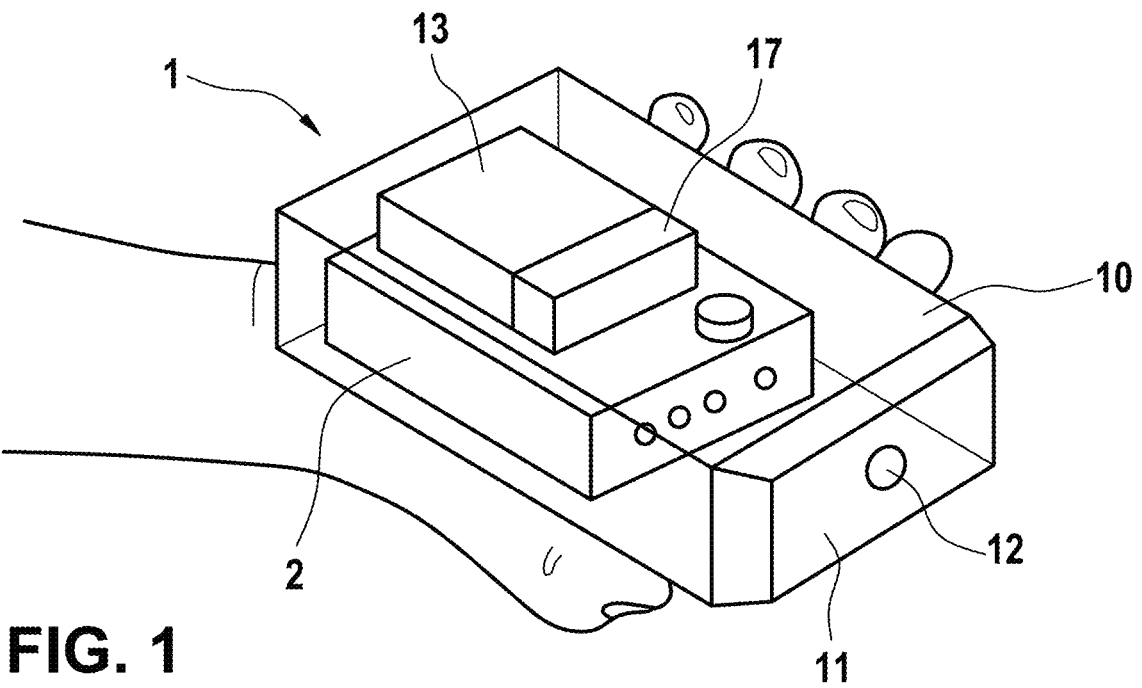
FIG. 1 shows a perspective view of a gas detection apparatus held in a hand.

A gas detection apparatus according to a first embodiment of the invention is denoted in its entirety by the reference 1, cf. FIG. 1. It has an approximately cuboid housing 10, on one end side 11 of which an inlet 12 for delivering at least one gas mixture to be analysed is arranged. Arranged inside the housing 10, there are a measuring device 2 and a voltage supply unit 13, which functions as an energy store for operating the gas detection apparatus. An evaluation and control circuit 18, which is attached inter alia to the measuring device 2, is furthermore provided.

Figure 2:
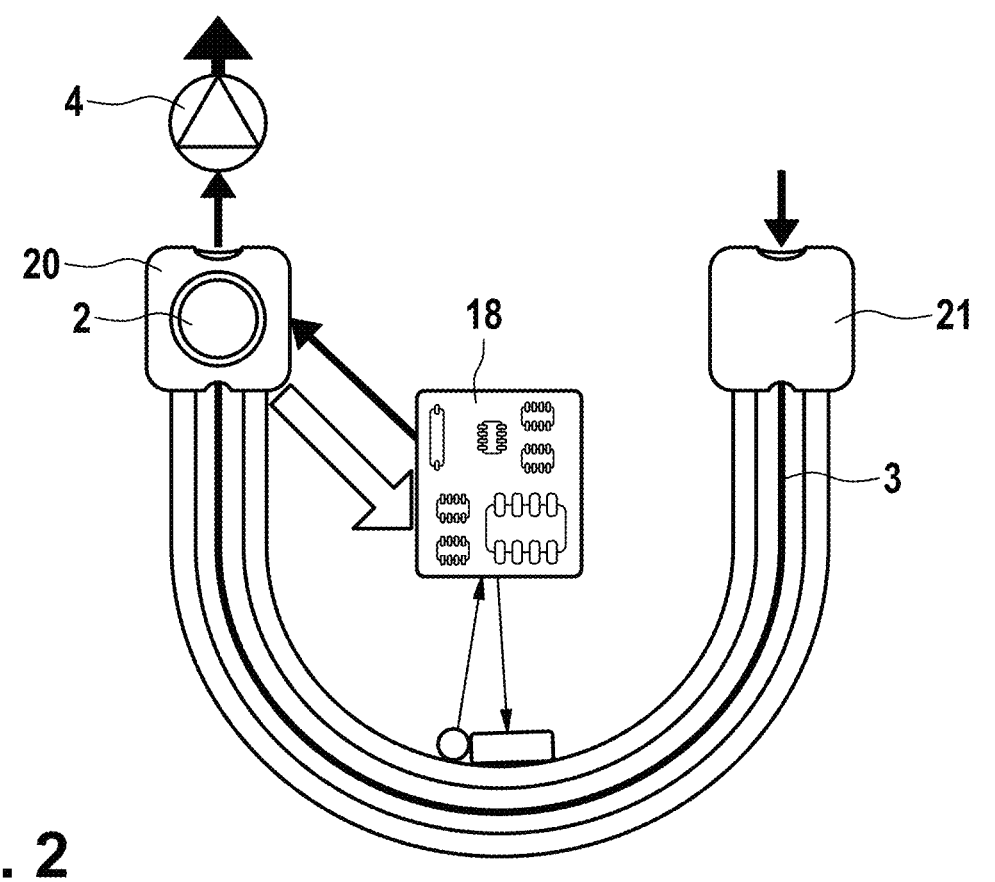
FIG. 2 shows a schematic plan view of a gas detection apparatus comprising a measuring device with an upstream gas chromatography separating column.

The measuring device 2 comprises two measurement chambers 6 and 6' and two measurement detectors 7 and 7' (one for each measurement chamber 6 and 6'), as well as a separating column 3, both of which are arranged on an attachment block 20, cf. FIG. 2; a further attachment block 21, to which the separating column 3 is attached with its start, is furthermore provided. Optional fluid lines for delivery and discharge of at least one gas mixture, as well as energy supply lines and measurement or signal lines, are not represented. The gas mixture to be analysed is conveyed from the inlet 12 via fluid lines (not represented) to the measuring device 2, through the latter and from there via a pump 4, formed in this exemplary embodiment as a fan unit, to an outlet (not represented) from the housing 10.

The measuring device 2 will be explained in more detail below with reference to FIGS. 3A and 3B. The measuring device 2 is formed as a photoionization detector (PID) and comprises a radiation source 50, formed as a UV lamp, at one end. Along a radiation direction 51, the radiation source 50 emits electromagnetic radiation, in particular UV light, over a sufficient spectrum for the analysis of the gas mixture, but at least over two spectral lines. A flow direction in which the or each gas mixture flows through the measurement chambers 6, 6' lies in the plane of the drawing of FIG. 3A and FIG. 3B. The radiation direction 51 is perpendicular with respect to the plane of the drawing of FIG. 3A and lies in the plane of the drawing of FIG. 3B.

The description relates by way of example to an orientation of the gas detection apparatus 1 in which the radiation source 50 is arranged underneath and the measurement chambers 6, 6' are stacked vertically above the radiation source 50. The radiation source 50 is arranged directly below the first measurement chamber 6, which has an interior 60 enclosed by a wall 61. FIG. 3A shows the first measurement chamber 6. A second measurement chamber 6' is preferably constructed in the same way as the first measurement chamber 6. An opening 64 for the inward flow of the gas mixture and an opening 65 for the outward flow of the gas mixture from the interior 60 of the first measurement chamber 6 of the gas detection apparatus 1 are respectively arranged between two opposite sections 62, 63 of the wall 61. The flow directions through the openings 64, 65 are positioned on the same axis. These openings 64, 65 therefore define a direction for the flow of the gas mixture through the interior 60 of the measurement chamber 6. Two electrodes 71, 72 of the measurement detector 7 are furthermore arranged on the wall 61, specifically on opposite wall sections 62, 63 and on the left and right of the direction of the gas flow, respectively. Almost the entire interior 60 is located between them, so that the electrodes 71, 72 cover a large region and can therefore achieve a high measurement sensitivity.

Arranged between the radiation source 50 and the first measurement chamber 6, there is a measurement chamber separator 66 which forms a bottom element of the wall 61. The measurement chamber separator 66 comprises a measurement chamber window 68, which is transmissive for electromagnetic radiation but gastight, with an optical filter 69 in or on the measurement chamber separator 66. Magnesium fluoride, for example, is used as the material for the measurement chamber window 68 with the optical filter 69, although other materials which are permeable for electromagnetic radiation, in particular UV light, may also be used, for example lithium fluoride or calcium fluoride. The wall 61 of the measurement chamber 6 outside the measurement chamber window 68 consists of a nonionizing material, which is preferably also nontransmissive for electromagnetic radiation. Material examples therefor are polytetrafluoroethylene or plastic material, in particular made of polyethylene or polypropylene. Expediently, this material is electrically insulating in order to reduce the risk of a negative effect on the electromagnetic field registered by the measurement detector 7 in the interior 60 of the first measurement chamber 6.

Figure 3A:
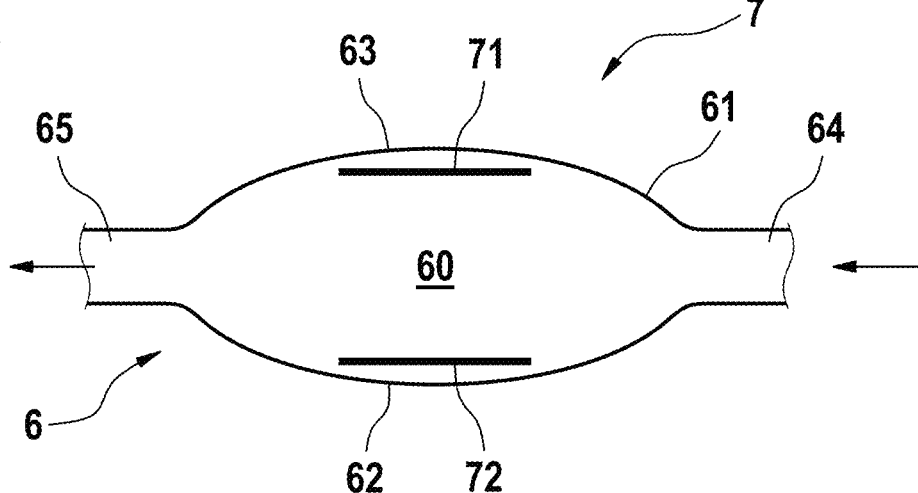
FIGS. 3A and 3B show a view in the radiation direction representing the inside of an individual measurement chamber and a side view of the gas detection apparatus with a radiation source and two measurement chambers.
Figure 3B:
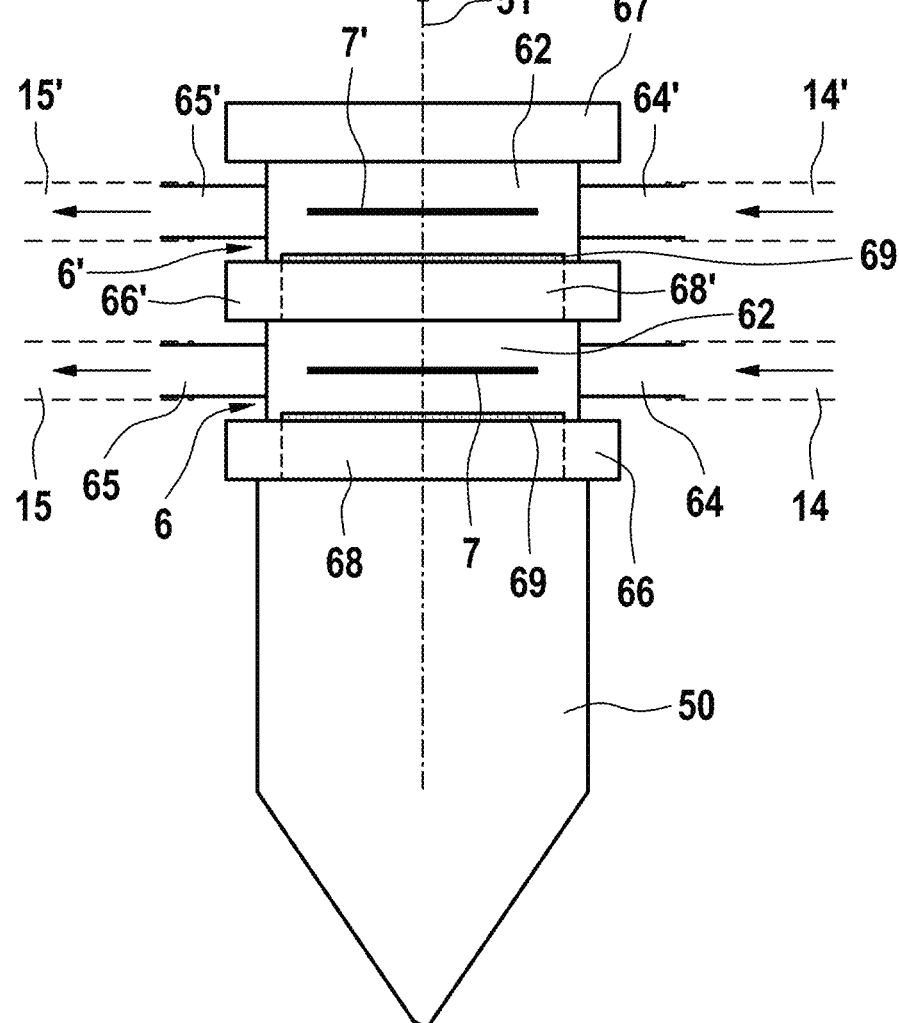

As may be clearly seen particularly in FIG. 3A, the measurement chamber 6 has an oval shape in its cross-sectional representation as seen in the radiation direction 51. In this case, the openings 64, 65 for the inlet and outlet of the gas mixture are arranged at the tip of the more strongly curved (transverse) sides and the electrodes 71, 72 are arranged, preferably centrally, on the less curved (longitudinal) sides. A laminar flow of the gas mixture through the measurement chamber 6 parallel to the measurement chamber separator 66 is therefore achieved. The laminar flow allows better use of the gas mixture flow rate for the measurement. Furthermore, no mixing of different gases entering at successive times takes place, so that the gas flow rate is used better. The outlay required for flushing, in particular the flow rate required for flushing, may be reduced in this way. This simplifies the fluid transport, reduces the energy consumption required therefor and thus allows greater reliability.

The design-dictated flow direction of the gas mixture flow rate is therefore orthogonal to the radiation direction 51. This leads to a high level of utilization of the radiation emitted by the radiation source 50.

The electrodes 71, 72 are arranged in such a way that they have no contact with the measurement chamber separator 66 and, in particular, are positioned spatially separated from the measurement chamber separator 66. Since the material typically used for the optical filters 69 of the measurement chamber separators 66 has a high dielectric constant (preferably in the range of from 4 to 5 for magnesium fluoride, for example, or in the range of from 6 to 7 for calcium fluoride), the arrangement of the electrodes 71, 72 separated from the measurement chamber separator 66 has the advantage of reducing the influence of the often unavoidable stray capacitance in many cases.

A second measurement chamber 6' is placed on the first measurement chamber 6 with a further measurement chamber separator 66' between them. The further measurement chamber separator 66' likewise has a measurement chamber window 68' with an optical filter 69', through which radiation from the first measurement chamber 6 shines into the second measurement chamber 6' along the radiation direction 51. Either a further measurement chamber separator 66' or a cover element 67 is arranged on the opposite side of the measurement chamber 6' from the measurement chamber separator 66. The description above for the first measurement chamber 6 moreover applies for the second measurement chamber 6', and in particular it has a design layout corresponding to the first measurement chamber 6, including the arrangement of the electrodes 71, 72 as represented in FIG. 3A. Elements which are the same or of the same type are provided with the same references. In this way, the radiation shone into the first measurement chamber 6 by the radiation source 50 propagates along the radiation direction 51, specifically through the measurement chamber separator 66' between the first measurement chamber 6 and the second measurement chamber 6', into the said second measurement chamber 6', so that a second measurement independent of the measurement in the first measurement chamber 6 is carried out there.

Figure 4:
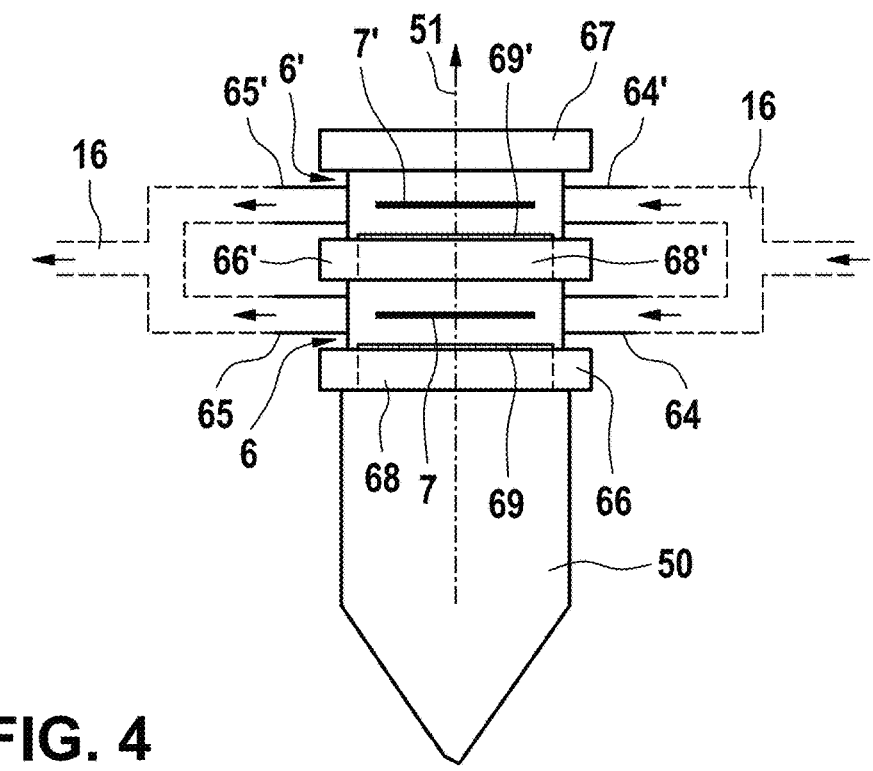
FIG. 4 shows a side view of a first embodiment of the gas detection apparatus with a fluid connection for parallel interconnection of the measurement chambers.

The measurement chambers 6, 6' may be supplied independently of one another with a gas mixture, optionally with different gas mixtures. This is represented by way of example in FIGS. 3A and 3B, different attachment lines 14, 14' being arranged for delivering different gas mixtures to the openings for the inward flow 64, 64' of the two measurement chambers 6, 6'. Correspondingly, different attachment lines 15, 15' may respectively be attached to the openings for the outward flow 65, 65'. Parallel interconnection of the measurement chambers 6, 6' (see FIG. 4) or series interconnection of the measurement chambers 6, 6' (cf. FIG. 5) may also be provided by means of fluid connections 16.

Since the same radiation source 50 is always used, coupling is achieved in respect of the radiation so that calibration is facilitated. In one configuration, the gas detection apparatus 1 comprises a calibration device 17 (cf. FIG. 1) which carries out calibration by using the radiation-related coupling of the measurement chambers 6, 6' and/or calibrates an upstream separating column 3 by means of the measurement detector 7' in the second measurement chamber 6'.

In a second embodiment, a further measurement chamber 6" having a further measurement chamber separator 66", further measurement chamber window 68" and further optical filter 69", as well as a further measurement detector 7", is arranged directly on the second measurement chamber 6' on the side of the second measurement chamber 6' facing away from the radiation source; likewise optionally a plurality of further measurement chambers in succession. This is illustrated in FIG. 5; in the explanation below, the same references are used for elements which are the same or of the same type as in the first embodiment.

Each of the second and further measurement chambers 6', 6" is provided in the same way as the first measurement chamber 6 with openings 64', 64" and 65', 65" respectively for the inward flow and outward flow of the gas mixture to be analysed. Line connections may be provided as fluid connections 16 between the measurement chambers 6, 6', 6", of which a fluid connection 16 between the first and second measurement chambers 6, 6' and a further fluid connection 16' between the second and third measurement chambers 6', 6" are represented by way of example in FIG. 5 for illustration. In this way, the measurement chambers 6, 6', 6" can be interconnected successively in the flow direction and the gas mixture to be analysed can thus be fed from one measurement chamber 6 into the next measurement chamber 6', 6". In this way, a plurality of measurement series may be carried out overlapping in time with the same gas mixture to be analysed.

Figure 5:
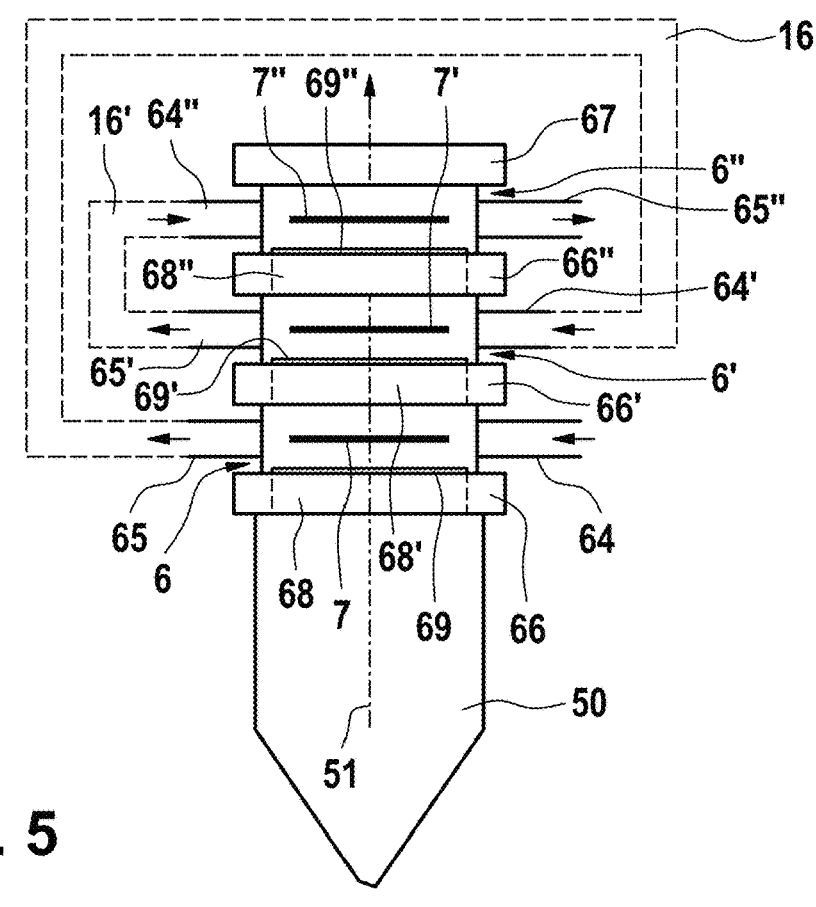
FIG. 5 shows a side view of a second embodiment of the gas detection apparatus with measurement chambers stacked on one another and a fluid connection for series interconnection.

FIG. 5 shows a series interconnection of three measurement chambers 6, 6', 6". It is also possible for at least three measurement chambers 6, 6', 6" to be interconnected in parallel.

One particular advantage is that at least some of the optical filters 69, 69', 69" may be formed in such a way that their transmission properties differ from one another. Here, "differing" is intended in particular to mean that the second optical filter 69' has a narrower passband than the optical filter 69 between the radiation source 51 and the first measurement chamber 6. One particular configuration is that, in the case of emission of two spectral lines in the region of 10.0 and 10.6 eV (electron volts) by the radiation source, both are sent through the first optical filter 69 and the first measurement chamber separator 66 into the first measurement chamber 6, but the second optical filter 69' for the second measurement chamber 6' has a narrower passband so that only the spectral line at 10.0 eV can then pass through. In this way, at least two target gases in the gas mixture to be analysed may be detected and distinguished from one another by different absorption capacities at the different spectral lines being evaluated. Furthermore, benefits of using particular spectral lines may be combined with one another, for example if a better detection limit can be achieved at the 10.6 eV spectral line, which is advantageous in particular for a laser detector in a probe measurement path, and/or if a better selectivity can be achieved at the 10.0 eV spectral line, which is advantageous in particular for a separating measurement path. By virtue of this multiple measurement chamber arrangement, broadband measurements on the one hand and selective measurements on the other hand may be carried out simultaneously with the same measuring device 2.

It is furthermore possible to connect the openings 64, 64', 64" for the inward flow of the various measurement chambers 6, 6', 6" differently to attachment lines 14 and/or a capillary of the separating column 3 (cf. FIG. 2), so that not only one but optionally a plurality of separating columns 3, or in the case of multi-capillary separating columns the individual capillaries, may respectively be attached and measured economically and compactly. In this way, different gas mixtures to be analysed may be delivered to the measurement chambers 6, 6', 6"; it is, however, also possible to interconnect at least some of the measurement chambers in series (as represented by the fluid connection 16 in FIG. 5), so that the same gas mixture to be analysed flows successively through the different measurement chambers and may thus, for example, be measured by using different spectral lines, as explained above. To this end, in particular, the pump 4 may function as a motive force for the required flow of the gas.

For the formation of the cover element 67 lying furthest away from the radiation source 50 in the radiation direction 51, alternative configurations are shown FIGS. 7A, 7B. Thus, a reflector 76 may be fitted onto this cover element 67 of the last measurement chamber 6' or 6" in the radiation direction so as to reflect the radiation back again through the different measurement chambers 6", 6', 6 counter to the original radiation direction 51 and thus efficiently increase the overall radiation. Together with the above-described arrangement of the electrodes 71, 72, this has the advantage that the cover element 67 may remain free of the electrodes 71, 72. This makes it possible to arrange a large-area reflector 76 on the cover element 67 so as to increase the usable radiation in the respective interior 60 of the two measurement chambers 6 and 6' with little outlay.

As an alternative, however, a second radiation source 50' which shines electromagnetic radiation into the measurement chambers 6", 6', 6 from an opposite side and preferably with a different spectrum, i.e. differing from the radiation source 50, may also be fitted on the cover element 67, which opens up additional possibilities for the measurement. In particular, the radiation may thus be enhanced and a higher measurement sensitivity may thus be achieved, or additional measurement variants may be developed by radiation with a different spectrum, or spectral lines. The two radiation sources 50, 50' may also emit radiation with the same spectrum.

An example of an expedient combination of six measurement chambers I to VI with mutually different measurement chamber separators 66 or optical filter 69', 69 (here by way of example made of magnesium fluoride and calcium fluoride, respectively) for different spectral lines is given in the table below. In this case, a probe path to which the measurement chambers I and VI are attached and a measurement path comprising a plurality of capillaries (OP-1 or DB-624) of the separating column of a gas chromatograph (GC), to which the other measurement chambers are connected, are formed. In this case, measurement chambers I and IV, II and V as well as III and VI are respectively interconnected successively in the flow direction by means of fluid connections 16:

| | Function | Max. ionization energy [eV] |
|---|---|---|
| Lamp | UV source | 10.6 |
| UV window [MgF2] | Measurement chamber separator | |
| Sample space of measurement chamber I | GC with OP-1 | 10.6 |
| UV window [MgF2] | Measurement chamber separator | |
| Sample space of measurement chamber II | GC with DB-624 | 10.6 |
| UV window [MgF2] | Measurement chamber separator | |
| Sample space of measurement chamber III | Probe | 10.6 |
| UV window [CaF2] | Measurement chamber separator with optical filter | |
| Sample space of measurement chamber IV | GC with OP-1 | 10.0 |
| UV window [MgF2] | Measurement chamber separator | |
| Sample space of measurement chamber V | GC with DB-624 | 10.0 |
| UV window [MgF2] | Measurement chamber separator | |
| Sample space of measurement chamber VI | Probe | 10.0 |
| UV reflector | Reflection | |

In an alternative embodiment, which is represented in FIG. 6, the electrode 71 is arranged on the measurement chamber separator 66 and the electrode 72 is arranged on the cover element 67. This permits spatially extended electrodes 71, 72. They should consist of material which is transparent for the radiation or, alternatively, should not occupy the entire surface, so that the radiation emitted by the radiation source 50 can enter the measurement chambers 6, 6'.

The invention claimed is:

1. A gas detection apparatus for the detection of at least one target gas in at least one gas mixture, wherein the gas detection apparatus comprises:
   a radiation source configured to emit electromagnetic radiation, a first measurement chamber, a second measurement chamber, a first measurement detector, and a second measurement detector,
   wherein the second measurement chamber is spatially separated from the first measurement chamber,
   wherein the gas detection apparatus is configured in such a way that a first gas mixture flows through the first measurement chamber and a second gas mixture flows through the second measurement chamber,
   wherein the gas detection apparatus is configured in such a way that electromagnetic radiation emitted by the radiation source passes initially through the first measurement chamber and subsequently through the second measurement chamber, wherein the first measurement detector is configured to:

measure a gauge of a physical effect in the first measurement chamber caused by electromagnetic radiation which passes through the first measurement chamber and correlating with a presence of the at least one target gas in the first measurement chamber, and generate a first signal correlating with the physical effect in the first measurement chamber, wherein the second measurement detector is configured to:

measure a gauge of a physical effect in the second measurement chamber caused by electromagnetic radiation which passes through the second measurement chamber and correlating with the presence of the at least one target gas in the second measurement chamber, and generate a second signal correlating with the physical effect in the second measurement chamber, and wherein the first measurement detector is configured to detect at least one predetermined target gas in the first measurement chamber and to generate a signal correlating with the presence or absence of the at least one target gas as the first signal, and the second measurement detector is configured to analyze the gas mixture in the second measurement chamber and to generate a signal correlating with a composition of the gas mixture as the second signal.

2. The gas detection apparatus of claim 1, wherein the gas detection apparatus is configured in such a way that a radiation direction in which electromagnetic radiation passes through the first measurement chamber is perpendicular or oblique with respect to a flow direction in which the first gas mixture flows through the first measurement chamber, and/or a radiation direction in which electromagnetic radiation passes through the second measurement chamber is perpendicular or oblique with respect to a flow direction in which the second gas mixture flows through the second measurement chamber.

3. The gas detection apparatus of claim 1, wherein the gas detection apparatus comprises a measurement chamber separator, which separates the first measurement chamber in a gastight fashion from the second measurement chamber and forms both a part of a wall of the first measurement chamber and a part of a wall of the second measurement chamber, a measurement chamber window which is permeable for electromagnetic radiation being formed in the measurement chamber separator, and the gas detection apparatus being configured in such a way that electromagnetic radiation emitted by the radiation source passes through the first measurement chamber, then the measurement chamber window and then the second measurement chamber.

4. The gas detection apparatus of claim 3, wherein the measurement chamber window is provided with an optical filter and the optical filter is adapted to attenuate electromagnetic radiation in at least one wavelength range.

5. The gas detection apparatus of claim 1, wherein the gas detection apparatus comprises a first optical filter and a second optical filter, the first optical filter being located between the radiation source and the first measurement chamber and the second optical filter being located between the first optical filter and the second measurement chamber.

6. The gas detection apparatus of claim 1, wherein a fluid connection connects the first measurement chamber to the second measurement chamber so that the first gas mixture and the second gas mixture are the same gas mixture, and the gas mixture flows initially through one of the first and second measurement chambers, then through the fluid connection and then through the other of the first and second measurement chambers.

7. The gas detection apparatus of claim 6, wherein the gas detection apparatus is configured in such a way that the gas mixture flows initially through the first measurement chamber, then through the fluid connection and then through the second measurement chamber.

8. The gas detection apparatus of claim 1, wherein the first and second measurement chambers are arranged in parallel with one another, the first gas mixture and the second gas mixture are the same gas mixture, and the gas detection apparatus is configured in such a way that a first part of the gas mixture flows through the first measurement chamber and a second part of the gas mixture flows through the second measurement chamber.

9. The gas detection apparatus of claim 1, wherein the gas detection apparatus comprises a reflector for electromagnetic radiation, the radiation source and the reflector being arranged in such a way that the electromagnetic radiation emitted by the radiation source passes through the first and second measurement chambers for a first time, is reflected by the reflector and passes through the first and second measurement chambers for a second time.

10. The gas detection apparatus of claim 1, wherein a separating column is arranged before the second measurement chamber with respect to a flow direction of the second gas mixture.

11. The gas detection apparatus of claim 10, wherein the gas detection apparatus comprises a calibration device, which is configured to calibrate a sensitivity of the separating column by using the second measurement detector.

12. The gas detection apparatus of claim 1, further comprising a further measurement chamber and a further measurement detector for the further measurement chamber, the first measurement chamber, the second measurement chamber and the further measurement chamber being arranged in a stack, the gas detection apparatus being configured in such a way that electromagnetic radiation emitted by the radiation source passes through each measurement chamber at least once, and the further measurement detector being configured to measure a gauge of a physical effect in the associated further measurement chamber caused by electromagnetic radiation which passes through the associated further measurement chamber and correlating with the presence of the at least one target gas, and to generate a further signal correlating with the physical effect in the associated further measurement chamber.

13. The gas detection apparatus of claim 1, wherein the first measurement detector is or comprises a first ionization detector and the second measurement detector is or comprises a second ionization detector, the first ionization detector being configured to measure a gauge of the ionization of the at least one target gas in the first measurement chamber and to generate a first signal correlating with the ionization in the first measurement chamber as the first signal, and the second ionization detector being configured to measure a gauge of the ionization of the at least one target gas in the second measurement chamber and to generate a second signal correlating with the ionization in the second measurement chamber as the second signal.

14. The gas detection apparatus of claim 1, wherein the first measurement detector is or comprises a first absorption detector and the second measurement detector is or comprises a second absorption detector, the first absorption detector being configured to measure an absorption of electromagnetic radiation in the first measurement chamber as a gauge of the physical effect and to generate a signal correlating with the absorption in the first measurement chamber as the first signal, and the second absorption detector being configured to measure an absorption of electromagnetic radiation in the second measurement chamber as a gauge of the physical effect and to generate a signal correlating with the absorption in the second measurement chamber as the second signal.

15. The gas detection apparatus of claim 5, wherein the second optical filter has a narrower transmission band than the first optical filter.

16. A gas detection apparatus for the detection of at least one target gas in at least one gas mixture, the gas detection apparatus comprising:

a radiation source configured to emit electromagnetic radiation;

a first measurement chamber configured to receive a first gas mixture;

a second measurement chamber configured to receive a second gas mixture;

a first measurement detector; and a second measurement detector, the second measurement chamber being located at a spaced apart location from the first measurement chamber, the radiation source being configured to emit electromagnetic radiation such that the electromagnetic radiation first passes through the first measurement chamber and the electromagnetic radiation subsequently passes through the second measurement chamber, wherein the first measurement detector is configured to:

measure a gauge of a physical effect in the first measurement chamber caused by electromagnetic radiation which passes through the first measurement chamber and correlating with a presence of the at least one target gas in the first measurement chamber, and generate a first signal correlating with the physical effect in the first measurement chamber, wherein the second measurement detector is configured to:

measure a gauge of a physical effect in the second measurement chamber caused by electromagnetic radiation which passes through the second measurement chamber and correlating with the presence of the at least one target gas in the second measurement chamber, and generate a second signal correlating with the physical effect in the second measurement chamber, wherein the first measurement detector is configured to only detect whether at least one predetermined target gas is present in the first measurement chamber and to generate a signal correlating with a presence or absence of the at least one target gas as a first signal, and the second measurement detector is configured to analyze the gas mixture in the second measurement chamber and to generate a signal correlating with a composition of the gas mixture as the second signal.

17. The gas detection apparatus of claim 16, wherein the gas detection apparatus is configured in such a way that a radiation direction in which electromagnetic radiation passes through the first measurement chamber is perpendicular or oblique with respect to a flow direction in which the first gas mixture flows through the first measurement chamber, and/or a radiation direction in which electromagnetic radiation passes through the second measurement chamber is perpendicular or oblique with respect to a flow direction in which the second gas mixture flows through the second measurement chamber.

18. The gas detection apparatus of claim 16, wherein the gas detection apparatus comprises a measurement chamber separator, which separates the first measurement chamber in a gastight fashion from the second measurement chamber and forms both a part of a wall of the first measurement chamber and a part of a wall of the second measurement chamber, a measurement chamber window which is permeable for electromagnetic radiation being formed in the measurement chamber separator, and the gas detection apparatus being configured in such a way that electromagnetic radiation emitted by the radiation source passes through the first measurement chamber, then the measurement chamber window and then the second measurement chamber.

19. The gas detection apparatus of claim 18, wherein the measurement chamber window is provided with an optical filter and the optical filter is adapted to attenuate electromagnetic radiation in at least one wavelength range.

20. The gas detection apparatus of claim 16, wherein the gas detection apparatus comprises a first optical filter and a second optical filter, the first optical filter being located between the radiation source and the first measurement chamber and the second optical filter being located between the first optical filter and the second measurement chamber.

* * * * *